United States Patent
Pfeiffer et al.

(10) Patent No.: US 8,625,987 B2
(45) Date of Patent: Jan. 7, 2014

(54) MONITORING METHOD FOR A PASSIVE OPTICAL NETWORK

(75) Inventors: Thomas Pfeiffer, Stuttgart (DE); Michael Straub, Maulbronn (DE); Harald Schmuck, Schwieberdingen (DE); Jörg Hehmann, Weil der Stadt (DE)

(73) Assignee: Alcatel Lucent, Paris (FR)

(*) Notice: Subject to any disclaimer, the term of this patent is extended or adjusted under 35 U.S.C. 154(b) by 752 days.

(21) Appl. No.: 12/382,174

(22) Filed: Mar. 10, 2009

(65) Prior Publication Data
US 2009/0238559 A1   Sep. 24, 2009

(30) Foreign Application Priority Data
Mar. 18, 2008   (EP) .................................... 08290260

(51) Int. Cl.
*H04B 10/08* (2011.01)
(52) U.S. Cl.
USPC .................... 398/33; 398/38; 398/30; 398/67
(58) Field of Classification Search
USPC ............................ 398/25, 30, 33, 38, 66, 67
See application file for complete search history.

(56) References Cited

U.S. PATENT DOCUMENTS

| | | | | |
|---|---|---|---|---|
| 5,162,935 A | * | 11/1992 | Nelson | 398/107 |
| 5,504,606 A | * | 4/1996 | Frigo | 398/58 |
| 6,473,608 B1 | | 10/2002 | Lehr et al. | |
| 7,065,298 B1 | | 6/2006 | Munroe et al. | |
| 2007/0196108 A1 | * | 8/2007 | Tamai et al. | 398/77 |

FOREIGN PATENT DOCUMENTS

| | | |
|---|---|---|
| EP | 0 290 243 | 11/1988 |
| EP | 0 685 948 | 12/1995 |
| EP | 1 475 915 | 11/2004 |
| EP | 1 801 984 | 6/2007 |
| WO | WO 2006/023015 | 3/2006 |

OTHER PUBLICATIONS

Banwell, Thomas C., "Powering the Fiber Loop Optically—A Cost Analysis", Journal of Lighwave Technology, IEEE Service Center, Mar. 1, 1993, vol. 11, No. 3, pp. 481-494.

* cited by examiner

*Primary Examiner* — Kinam Park
(74) *Attorney, Agent, or Firm* — Harness, Dickey & Pierce

(57) ABSTRACT

The invention relates to a method for monitoring a passive optical network having a tree-like structure with a main line and a plurality of branches. The method includes transmitting a wake-up signal from an optical line termination (OLT) arranged in the main line to a plurality of monitoring units arranged in the branches. The method also includes detecting the wake-up signal and listening to information requests from the OLT in the monitoring units during a listening time interval after the detection of the wake-up signal. The method further includes transmitting an information request to be received in the listening time interval from the OLT to the monitoring units. The method additionally includes receiving the information request in the monitoring units during the listening time interval, one of the monitoring units which is addressed by the information request transmitting a response message back to the OLT.

10 Claims, 5 Drawing Sheets

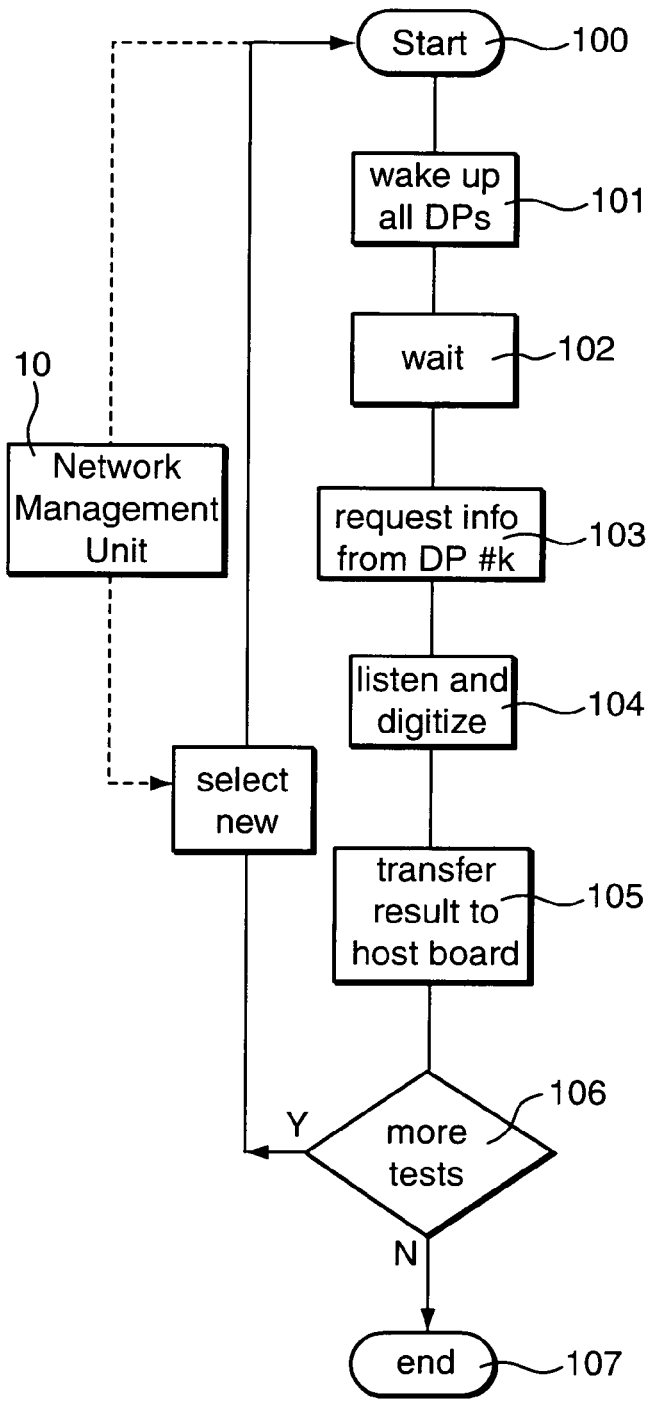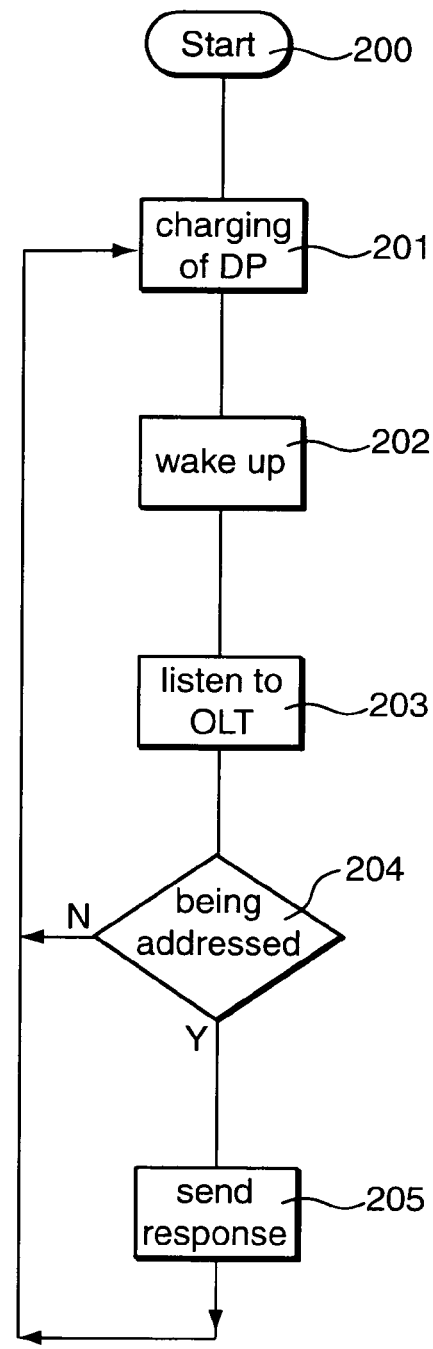
Fig. 3a                    Fig. 3b

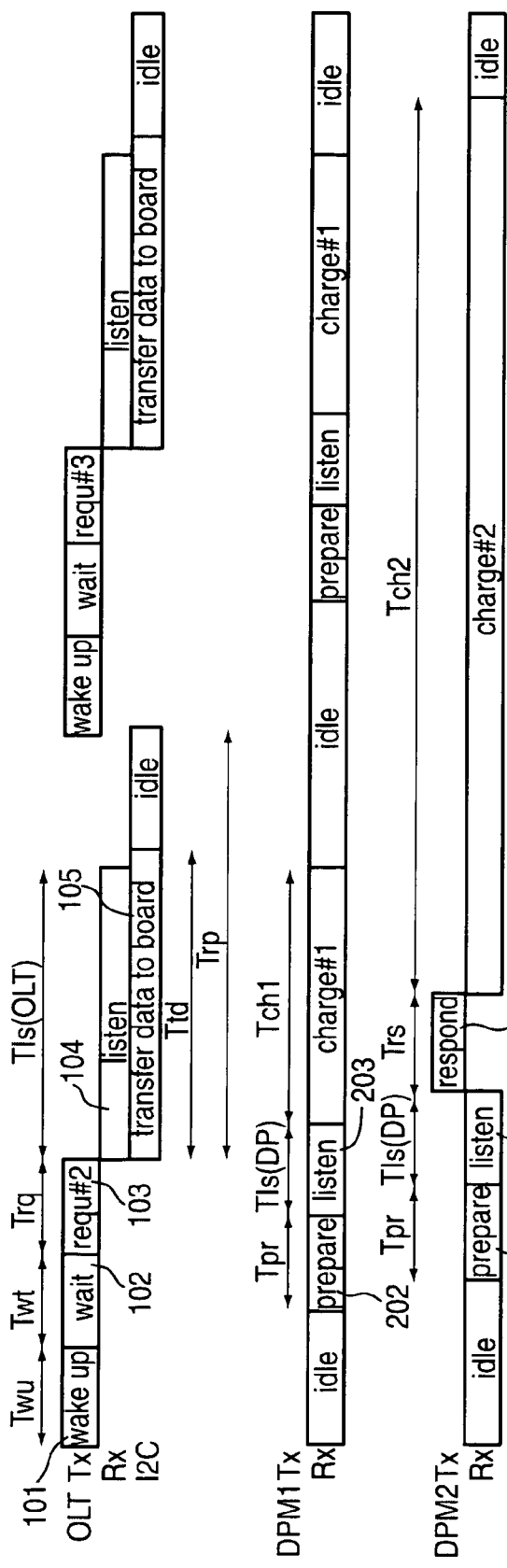

MONITORING METHOD FOR A PASSIVE OPTICAL NETWORK

BACKGROUND OF THE INVENTION

The invention is based on a priority application EP08290260.2 which is hereby incorporated by reference.

The invention relates to a method for monitoring a passive optical network (PON) having a tree-Like structure with a main line and a plurality of branches, to a monitoring unit connectable to a branch of a PON, and to a PON comprising at least one such monitoring unit.

In order to improve the quality of service of optical networks, in particular passive optical networks (PONs) with a tree-like structure, continuous monitoring techniques detecting and localizing faults are of special interest, as they are expected to provide substantial cost savings to telecommunications companies operating these networks.

However, due to the large distances which are covered by the fiber links of a PON, a network operator usually only has access to the network from the main line, in particular from an optical line termination, OLT, which is Located at a head end of the PON. For checking the functionality of the branches of the PON from the main line, it is known to dispose monitoring units in these branches which are usually arranged close to the location of the end users.

The downstream communication between the OLT and the monitoring units may be performed by the transmission of binary information including an identifier to a particular monitoring unit which may then execute a predefined function. In this respect, EP 1 037 417 B1 discloses a method for performing central control of an in-line element such as an optical amplifier or an optical switch in a tree-like network, wherein the OLT adds extra bits in predefined grants sent downstream to the in-line element. These extra bits comprise an identification of the in-line element and contain a locally predefined function for execution by the selected in-line element.

However, for performing central control in the way described above, the grant messages must be captured out of the downstream transmission, such that the in-line elements or further elements used for operation and maintenance have to listen permanently to the downstream transmissions for identifying and processing the grant messages.

OBJECT OF THE INVENTION

It is the object of the invention to provide: a monitoring method, a monitoring unit, and a PON, all of which allow a reliable and cost-effective monitoring of the PON from the main line.

SUMMARY OF THE INVENTION

This object is achieved by a method as described above, comprising the steps of: transmitting a wake-up signal from an optical line termination, OLT, arranged in the main Line to a plurality of monitoring units arranged in the branches; in the monitoring units, detecting the wake-up signal and Listening to information requests from the OLT during a pre-defined listening time interval after the detection of the wake-up signal; transmitting an information request to be received in the listening time interval from the OLT to the monitoring units; and receiving the information request in the monitoring units during the listening time interval, one of the monitoring units which is addressed by the information request transmitting a response message back to the OLT.

It should be noted that throughout the following description, the term OLT refers to a network entity which is arranged in the main line, typically at the head end of the PON, and which performs the communication with the monitoring units. The OLT as described herein may also perform regular data transmissions to and from the ONTs arranged at the ends of the branches of the PON, however, this is not necessarily the case, i.e. the OLT as described herein and the OLT which performs regular data transmissions may be implemented in two different physical entities.

In the method described above, when no monitoring of the PON is required, the monitoring units are operated in a steep mode consuming only a low amount of electrical power. During the sleep mode, the monitoring units are capable to detect a simple, easily-recognizable wake-up signal transmitted from the OLT in downstream when monitoring of the PON is to be performed. The wake-up signal typically does not address a specific one of the monitoring units and may be implemented e.g. by using a frequency shift keying of a sine signal.

Only when the wake-up signal is detected, the monitoring units start to listen to information requests from the OLT during a listening time interval. "Listening" means that binary data contained in the downstream transmission can be identified and processed by the monitoring units, such that each monitoring unit is capable to determine if the information request from the OLT is addressed to it by comparing the binary data contained in an address field of the information request with its own address which is typically unique in the PON.

In such a way, only the monitoring unit which is addressed by the information request wilt send a response message back to the OLT. The response message may contain information about the status of the monitoring unit, or the response message may be used to signal to the OLT that the monitoring unit is ready for subsequent communications. In the way described above, the monitoring units need only listen to downstream traffic during a pre-defined listening time interval and can be operated in a sleep mode for the rest of the time, thus considerably reducing their power consumption and quickly being ready again for subsequent requests from the OLT. Moreover, no complicated protocol such as TDMA (Time Division Multiple Access) is required for the communication between the OLT and the monitoring units.

In a preferred variant, after the detection of the wake-up signal, the monitoring units are switched from a first operation mode with lower power consumption to a second operation mode with higher power consumption. After switching from the first to the second operation mode, a listening unit, e.g. a microprocessor, may be activated, the latter being capable to read and process binary signals in the downstream transmission. For waking up the microprocessor, a preparation time may be required, such that the information request may not be sent immediately after the wake-up signal to ensure that the information request can be processed in the monitoring units during the listening time interval. Alternatively, the detection of the wake-up signal as well as the listening may be performed in an appropriate passive electrical circuit, the microprocessor only being activated for transmitting the response signal, after the passive electrical circuit has detected that the information request is addressed to the monitoring unit.

The person skilled in the art will appreciate that no separate physical entity is required for performing the switching: For example, when performing the detection of the wake-up signal with low power consumption also in a microprocessor (e.g. in an input stage), the listening and receiving processes which are subsequently performed in the microprocessor will automatically increase its power consumption.

In an advantageous variant, after the end of the transmission of the information request, no further wake-up signal is transmitted by the OLT during a pre-defined repetition time interval, the repetition time interval being preferably sufficiently long to transfer the information contained in the monitoring unit's response message from the OLT to a network management unit. After the transmission of the information request, the OLT listens to the response messages from the monitoring units during a pre-defined listening time interval which is essentially determined by the transmission time of the information request to the monitoring unit having maximum distance from the OLT and the transmission time of the response message from that monitoring unit back to the OLT plus some additional amount of time to account for processing delays internal to the monitoring units. The repetition time interval has to be longer than the listening time interval in order to ensure that also information contained in the response message from the monitoring unit having maximum distance from the OLT can be transferred to the network management unit.

In a preferred variant, the repetition time interval is sufficiently long to allow an energy storage of a monitoring unit which is not addressed by the information request to fully recharge by extracting energy from the downstream transmissions of the OLT. As the monitoring units are typically switched to an operation state with higher electrical power consumption after the detection of the wake-up signal, when the repetition time interval is chosen too short, after a plurality of monitoring cycles in which the monitoring unit is not addressed, the rechargeable energy storage may be totally discharged such that listening to further information requests may no longer be possible. In contrast thereto, the energy storage of the monitoring unit which is addressed by the information request may be totally discharged after sending the response message and may only be fully recharged after several monitoring cycles, as it is usually not necessary to address the same monitoring unit more than once during subsequent monitoring cycles.

In another preferred variant, each bit of the response message is encoded as a binary sequence of chips, each sequence of chips being correlated with a pre-defined chip sequence for recovering the bits of the response message in the OLT, preferably each chip being further divided into a plurality of samples, each chip being recovered in the OLT by averaging over at least part of the plurality of samples. Typically, the wavelength bands of the downstream transmissions from the OLT to the monitoring units and of the upstream transmissions from the monitoring units back to the OLT are chosen to be identical, whereas the optical network terminations (ONTs) located at the endpoints of the branches of the PON transmit their upstream traffic in a different wavelength band, as defined by the respective data protocol. When identical upstream and downstream wavelength bands are used, the encoding provides a way of distinguishing the response messages from accidentally reflected or backscattered signals generated by the OLT, as a lot on noise may be present in this case.

One advantageous way to do this is to encode the bits of the response messages for improving detection at the OLT, typically by dividing a time interval reserved for transmitting a bit into several, e.g. eight, sub-intervals, each sub-interval defining a so-called chip having also a binary value (0 or 1). By a subsequent correlation of the chip sequence with a known codeword comprising e.g. eight chips, being preferably identical for all monitoring units of the PON, each bit of the response message may be recovered.

The time-interval for each chip may further be divided into sub-intervals, each sub-interval corresponding to a sample having also a binary value. The chips may then be recovered by averaging over at least part, typically all of the samples for improving the signal-to-noise ratio (SNR). Preferably, the sampling is performed asynchronously with respect to the chip phase, usually a preamble being needed for recovering the chip phase in this case. In case that only one sample per chip is present, optimal sampling of the chips cannot be assured. Thus, an oversampling of several samples per chip may be performed to find the correct timing (which is the right set of five samples?) by subsequently comparing the detected chip patterns with the expected code words. An additional preamble at the beginning of the message further helps in identifying the start of the message.

A further aspect of the invention is implemented in a monitoring unit connectable to a branch of a passive optical network, PON, comprising: a detection unit for detecting a wake-up signal transmitted to the monitoring unit from an optical line termination, OLT, arranged at the head end of a main line of the PON, a listening and receiving unit for listening to information requests from the OLT during a pre-defined listening time interval after the reception of the wake-up signal and for receiving the information request from the OLT during the listening time interval, and a transmitting unit for transmitting a response signal from the monitoring unit back to the OLT in case that the received information request addresses the monitoring unit. The monitoring unit has a unique address in the PON, by which it identifies an information request which is targeted to it.

In a preferred embodiment, the monitoring unit further comprises: a switching unit for switching from a first operation mode with lower power consumption to a second operation mode with higher power consumption after the detection of the wake-up signal, the second operation mode allowing the monitoring unit to listen to information requests transmitted in downstream by the OLT. Although the switching unit may be an electrical element such as a relay, this is not necessarily the case, as the microprocessor itself may perform the detection of the wake-up signal and/or the listening and may automatically switch from a sleep mode with low power consumption to an operation mode with higher power consumption.

In a highly preferred embodiment, the monitoring unit further comprises: a rechargeable energy storage, and an energy conversion unit for converting optical energy from the downstream transmission signal of the OLT to electrical energy, the electrical energy being used for charging the rechargeable energy storage, typically during the first operation mode. In such a way, part of the optical signal which is to be tapped from the branch to which the monitoring unit is connected can be used for providing the monitoring unit with energy (so-called energy harvesting). Of course, it is alternatively also possible to use a conventional battery as a power supply for the monitoring units, or to use a monitoring unit which combines the energy harvesting with a conventional battery.

A further aspect of the invention is implemented in a passive optical network, PON, comprising: a main line, an optical line termination, OLT, arranged at the head end of the main line, and a plurality of branches connected to the main line, wherein at least one of the branches comprises a monitoring unit as described above. Monitoring of such a PON can be advantageously performed in the way described above.

In a preferred embodiment, the passive optical network is an operator network and the monitoring unit is arranged in the operator network adjacent to a demarcation point to a user network. By placing the monitoring units close to a demarcation point, i.e. close to the border line between the operator network and a user network, the monitoring units can be used to distinguish between network failures within the operator network and network failures within the user network.

Further features and advantages are stated in the following description of exemplary embodiments, with reference to the figures of the drawing, which shows significant details, and are defined by the claims. The individual features can be implemented individually by themselves, or several of them can be implemented in any desired combination.

BRIEF DESCRIPTION OF THE DRAWINGS

Exemplary embodiments are shown in the diagrammatic drawing and are explained in the description below. The following are shown.

DETAILED DESCRIPTION OF PREFERRED EMBODIMENTS

Figure 1:
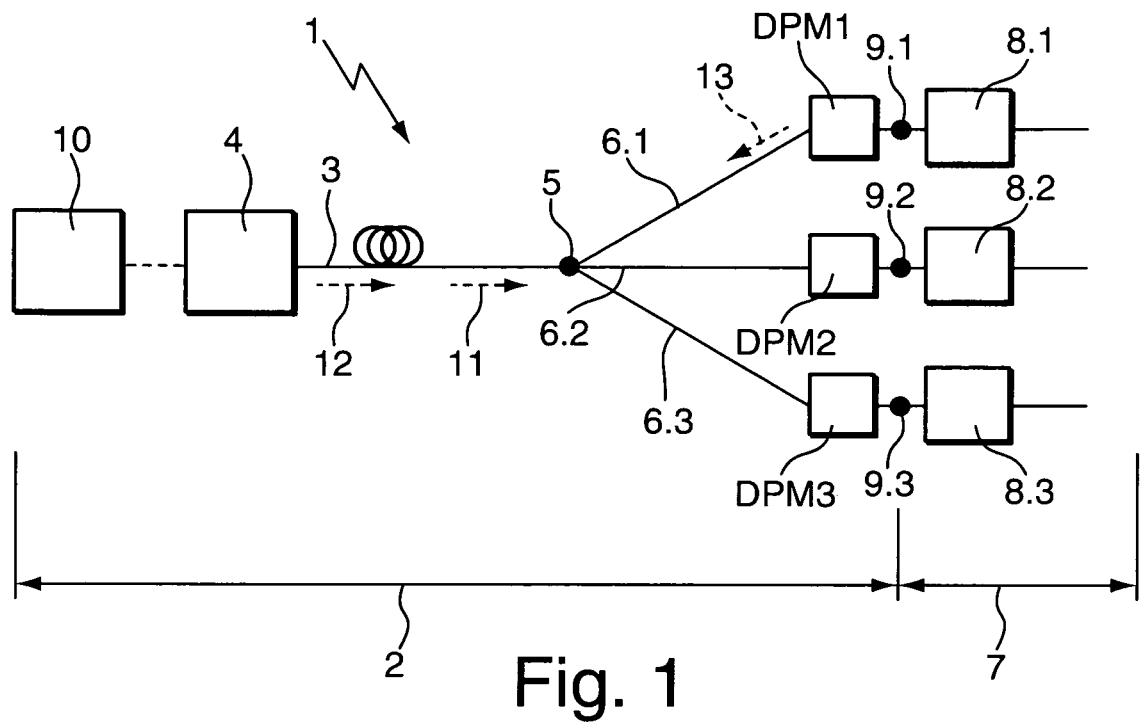
FIG. 1 a schematic diagram of an embodiment of a PON according to the invention, FIG. 2 a schematic diagram of an embodiment of a monitoring unit according to the invention, FIGS. 3a,b two flow-charts representing the signaling and data processing in a monitoring unit (a) and in the OLT (b), FIG. 4 a timing diagram of the message flow between the OLT and the three monitoring units of FIG. 1 together with the available electrical energy in a power supply of the monitoring units, FIG. 5 specific time durations of the timing diagram shown in FIG. 4, FIGS. 6a-c examples for the structure of a wake-up message (a), an information request (b), and a response message (c), and FIG. 7 the decoding of an encoded response message in the OLT.

FIG. 1 shows a passive optical network 1 which comprises a tree-like operator network 2 as a first section. The operator network 2 has a main fiber line 3 being located between an Optical Line Termination (OLT) 4 and a 1×N passive optical distribution network (splitter) 5 connecting the main line 3 with a number of branches, three of which (6.1 to 6.3) are shown in FIG. 1. The branches 6.1 to 6.3 of the operator network 2 are continued in a user network 7 which constitutes a second section of the optical network 1 and which comprises Optical Network Terminations (ONTs) 8.1 to 8.3, one for each of the branches 6.1 to 6.3. A so-called demarcation point 9.1 to 9.3 marks the limit between the operator network 2 and the user network 7 in each of the branches 6.1 to 6.3. In the operator network 2, monitoring units DPM1 to DPM3 are arranged adjacent to each of the demarcation points (DPs) 9.1 to 9.3, which, due to their position in the optical network 1, are also referred to as a demarcation point monitors (DPMs). Furthermore, a network management unit 10 is connected to the OLT 4, the network management unit 10 triggering the communication of the OLT 4 with the monitoring units DMP1 to DPM3 for monitoring of the PON 1. The person skilled in the art will appreciate that the PON 1 of in FIG. 1 only represents the basic structure of a PON and that real PONs are usually much more complex. Typical specifications of the PON 1 today are about 20 km or more fiber length from the OLT 4 to the ONTs 6.1 to 6.3, and a split ratio at the splitter 5 of typically 1:32 or more.

For monitoring of the network 1, a process represented in FIG. 3a is performed in the OLT 4. After the start of the process in a first step 100, being triggered by the network management unit 10, the OLT 4 generates a wake-up signal 11 (see FIG. 1) which is transmitted downstream through the branches 6.1 to 6.3 of the operator network 2 to the monitoring units DPM1 to DPM3 in a second step 101. The wake-up signal 11 is an easily detectable message which typically cannot address a particular one of the monitoring units DPM1 to DPM3. After the start of the transmission of the wake-up signal 11, in a further step 102, the OLT 4 waits for a pre-defined time before starting the transmission of an information request 12 being addressed to the second monitoring unit DPM2 in a subsequent step 103. After the transmission of the information request 12, the OLT 4 switches to a listening state for listening to a response message 13 transmitted from the second monitoring unit DPM2 in upstream in a further step 104. When the response message 13 is received, the latter is first digitized and decoded before it is transferred from the OLT 4 to the network management unit 10 in a further step 105, thus finishing a monitoring cycle for the second monitoring unit DPM2.

In a following step 106, a decision is made if further testing of the PON 1 is required, the decision being also triggered by the network management unit 10. In case that no further monitoring is necessary, the monitoring process ends in a final step 107. Otherwise, in a further step 108, a selection is made for deciding which one of the monitoring units DPM1 to DPM3 should be addressed in the following monitoring cycle, the selection being made by the network monitoring unit 10. In the latter case, the monitoring process ends only after a plurality of further monitoring cycles, typically when all of the monitoring units DPM1 to DPM3 have been addressed by the OLT 4.

Referring now to FIG. 3b, the process being performed by the second monitoring unit DPM2 during the monitoring cycle which has been explained above will be described in greater detail. In a first step 200, the second monitoring unit DPM2 is activated, e.g. during a start-up after a downtime of the PON 1. The second monitoring unit DPM2, represented in a detailed view in FIG. 2, then branches part (about 5% of the total intensity) of the downstream signal via a tap coupler 14 from the branch 6.2 to an optical receiver comprising a photodiode which is used as an o/e-energy conversion unit 15. A detection unit 16 is provided in the signal path of the second monitoring unit DPM2 for detecting the wake-up signal 11 which may be an 8-bit sequence "10101010" shown in FIG. 6a, the time duration of each bit being e.g. of the order of 1 μs. The detection unit 16 may be implemented as an electrical circuit comprising only passive components. The switching between the bits of the wake-up signal 11 may be done by performing Frequency Shift Keying of a sine signal between e.g. 10 MHz and 20 MHz. When no wake-up signal is detected, the o/e-converted downstream transmission signal is fed to a rechargeable energy storage 17 in the form of a capacitor in a further step 201 for charging the latter.

Figure 2:
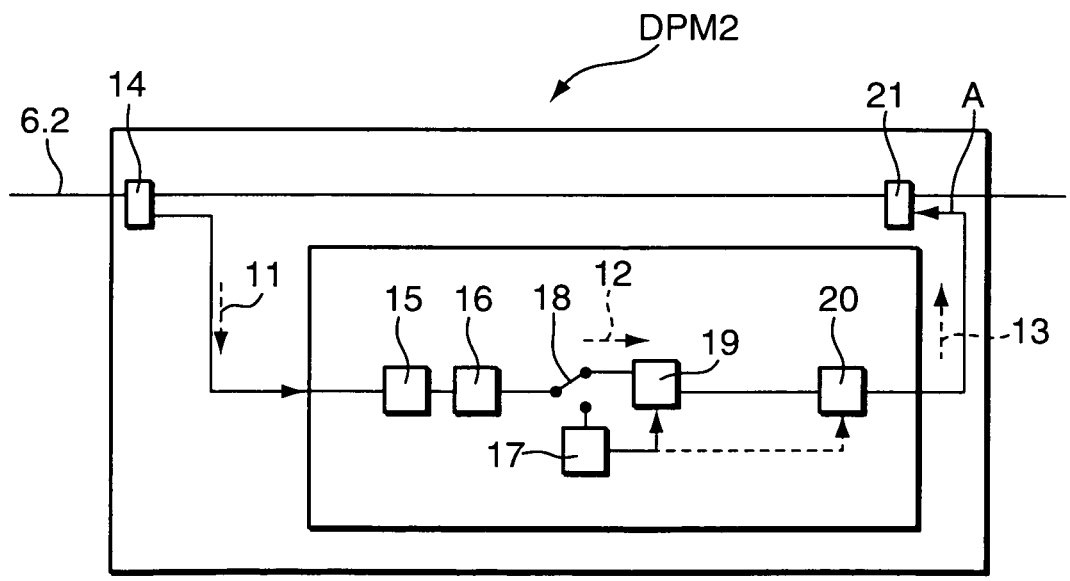

In case that the wake-up signal 11 is detected in the detection unit 15, in a further step 202, a switching unit 18 (e.g. relay) switches the monitoring unit DPM2 from the first operation state in which the energy storage 17 is continuously charged and only few energy is consumed to a second operation state in which the energy stored in the energy storage 17 is fed to a microprocessor 19 for activating the latter. The microprocessor 19 serves as a combined listening and reception unit for listening to the information request 12 from the OLT 4 during a pre-defined listening time interval after the reception of the wake-up signal 11 and for receiving the information request 12 during the listening time interval in a subsequent step 203. The person skilled in the art will appreciate that no separate switching unit 18 as shown in FIG. 2 may be required for activating the microprocessor 19, and, in particular, that both the detection of the wake-up signal 11 and the listening to the information request 12 may be also performed in the microprocessor 19, e.g. in an input stage thereof, only having a low power consumption.

The microprocessor 19 identifies the information request 12 (the structure of which is shown in FIG. 6b) by its preamble 12a containing a bit sequence which corresponds to the one used in the wake-up signal 11. Then, the microprocessor 19 compares the address field 12b (1 byte) contained in the information request 12 with the unique address of the monitoring unit DPM2 which is permanently stored in a memory of the monitoring unit DPM2 (not shown) in a further step 204 for deciding if the information request 12 is addressed to the monitoring unit DPM2. A further field 12c of the information request 12 is reserved for future use, e.g. for providing information about the type of data to be transmitted by the monitoring unit in upstream. A carrier frequency of the information request 12 may be 10 MHz, the bit duration being e.g. of the order of 1 μs, the modulation format being e.g. Amplitude-Shift Keying (ASK).

In the present case, the information request 12 is addressed to the second monitoring unit DPM2, such that instead of switching back to the first operation mode (step 201), the microprocessor 19 activates a transmitting unit 20 comprising a photodiode for performing e/o-conversion of a response message 13 generated in the microprocessor 19, the transmission unit 20 being connected to a tap coupler 21 for transmitting the response message 13 through the branch 6.2 back to the OLT 4 in a final step 205 before switching back to the first operation mode for re-charging of the energy storage 17.

In an alternative variant of the method described above, the microprocessor 19 may only be activated after it has been decided that the information request 12 is addressed to the monitoring unit DPM2. In this case, the detection of the wake-up signal 11, the listening to the information request 12, and the address recognition are performed in a (typically passive) electrical circuit, the microprocessor 19 only being activated for the transmission of the response message 13.

The typical structure of the response message 13 is shown in FIG. 6c, comprising a preamble 13a and an address field 13b having a structure corresponding to the one of the information request 12, a further field 13c of the response message 13 comprising two bytes which may be reserved for future use, typically containing information about the status of the monitoring unit DPM2, e.g. its temperature. However, transferring such status information is not mandatory, as the reception of the response message 13 in the OLT 4 without supplying further information is already sufficient to indicate that no break in the fiber line of the second branch 6.2 has occurred. The modulation format used for the response message 13 is typically Pulse-Code Modulation (PCM) and the bits of the response message 13 are usually encoded in a way which will be described in greater detail further below.

Figure 4:
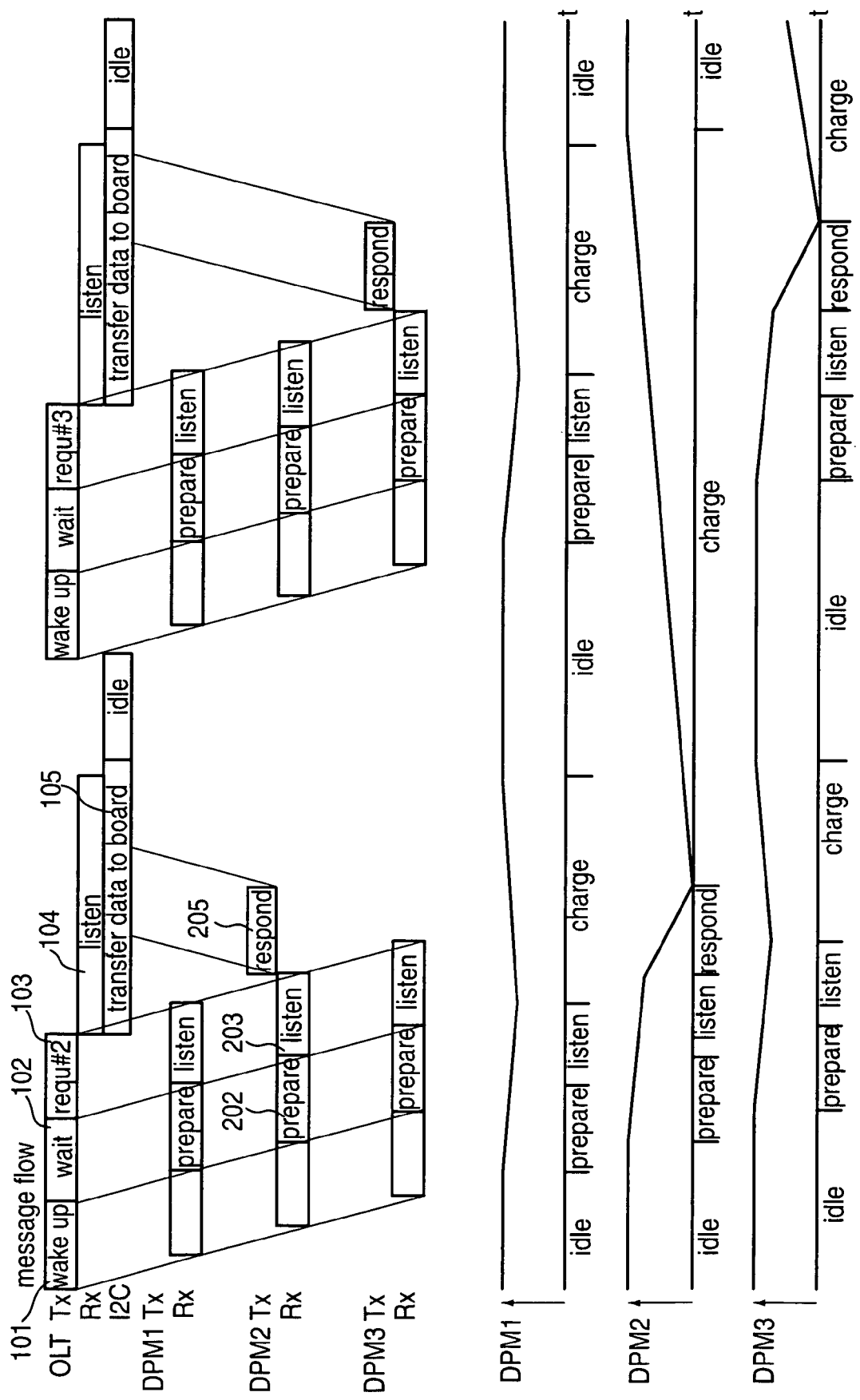

The process steps which have been described with reference to FIGS. 3a,b for a monitoring cycle which addresses the second monitoring unit DPM2 are also represented in FIG. 4, showing a timing diagram of the message flow, taking the different propagation times between the OLT 4 and the monitoring units DPM1 to DPM3 into account, the first monitoring unit DPM1 being Located closest to the OLT 4, the second and third monitoring units DPM2, DPM3 being arranged farther away from the OLT 4.

In FIG. 4, the terms Tx and Rx refer to the transmitting and receiving parts of the OLT 4 and of the monitoring units DPM1 to DPM3, respectively, and the term I2C refers to the I2C bus used for communication of the OLT 4 with the network monitoring unit 10. On the right-hand side of FIG. 4, a subsequent monitoring cycle is shown in which the third monitoring unit DPM3 is addressed. During the so-called idle periods, no action is performed by the OLT 4 and the monitoring units DPM1 to DPM3, respectively.

For each of the monitoring units DPM1 to DPM3, the charging status of the respective energy storages is represented in the bottom part of FIG. 4. During the so-called idle state, the energy storages of the monitoring units DPM1 to DPM3 are fully charged. After detection of the wake-up signal, the micro-processor 19 is activated and the energy storages are slowly discharged (steps 202, 203), as no energy harvesting is performed in this case. During the transmission of the response message, the energy consumption is further increased, the microprocessor 19 triggering the energy storage 17 to also supply energy to the transmitting unit 20 (dashed arrow in FIG. 2), thus leading to a complete discharge of the energy storages of the second and third monitoring units DPM2, DPM3 in their respective monitoring cycles. The person skilled in the art will appreciate that alternatively, a safety margin may be provided for each energy storage, such that the response messages can be sent even though a leakage current of the energy storages or the power consumption of the monitoring units DPM1 to DPM3 may be higher than expected. Alternatively or in addition, a conventional battery or external power source may be provided as a power supply for the monitoring units DPM1 to DPM3, which may be used to back up the supply of electrical power in case of a failure of the rechargeable power supply, an information about such a failure being typically included in the further field 13c of the response message 13.

As can be seen from FIG. 4, the timing of the individual process steps described with reference to FIGS. 3a,b has to be coordinated, in particular with respect to their time durations, which have to satisfy certain constraints. In this respect, FIG. 5 shows the process steps of FIG. 4 for the OLT and the first and second monitoring units DPM1, DPM2 together with symbols indicating their time durations (not to scale), typical values of which are summarized in the following table:

|     | item | symbol | typical value | condition |
| --- | --- | --- | --- | --- |
| OLT | wake up | Twu | 8 μs | fixed |
|     | wait | Twt |  | =Tpr |
|     | request | Trq | 24 μs | fixed |
|     | listen | Tls(OLT) | 625 μs | depends on memory, start time may be shifted |
|     | transfer data | Ttd | 5 sec | depends on amount of data stored |
|     | repetition time | Trp | 30 sec | >Tch1 and >Ttd |
| DP  | prepare | Tpr | 24 μs | depends on implementation |
|     | listen | Tls(DP) | 24 μs | ≥Trq, depends on implementation |
|     | respond | Trs | 32 μs | fixed |
|     | charge #1 | Tch1 | 20 sec | depends on implementation |
|     | charge #2 | Tch2 | 5 min | depends on implementation |

In the table shown above, the repetition time Trp between subsequent monitoring cycles has been chosen longer than the first charging time Tch1 which is required for fully charging the energy storage after the preparation and listening steps 202, 203. In such a way, a reduction of the available electrical energy of the energy storage during subsequent monitoring cycles can be avoided. Moreover, the repetition time Trp should be chosen to be sufficiently long to ensure that the transfer of the data received by the OLT 4 to the network management unit 10 can be finished before the start of a subsequent monitoring cycle. Further constraints for the timing are the minimum time (typically minutes) for collecting electrical energy in the monitoring units DPM1 to DPM3, being limited by the photovoltaic conversion efficiency, the maximum time (typically minutes) for storing electrical energy in the monitoring units DPM1 to DPM3 which is limited by the leakage current of the energy storage (capacitor) and the attached circuits, and the minimum time (typically seconds) for transferring the received data from the OLT 4 to the host board of the network management unit 10, the latter being limited by the I2C bus interface speed.

Figure 7:
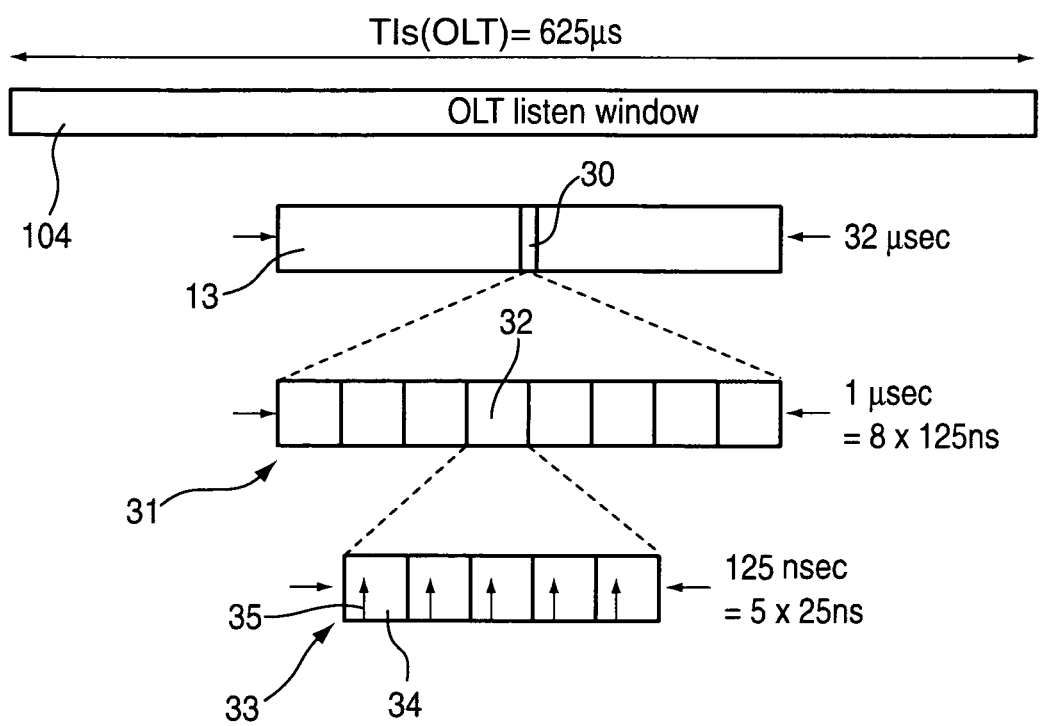

As the downstream traffic from the OLT to the monitoring units DPM1 to DPM3 and the upstream traffic from the monitoring units DPM1 to DPM3 back to the OLT 4 is performed on the same wavelength, it is advantageous to encode the response messages 13 for improving the detection at the OLT 4 in the presence of reflected downstream signals. For this purpose, FIG. 7 shows the detailed structure of the response message 13, in which each bit 30 is encoded as a binary sequence 31 of eight chips 32, each chip 32 being encoded in a further sequence 33 of five samples 34. Thus, the total number of samples used in the response message is 32 bits×8 chips/bit×5 samples/chip=1.28 kSamples. During the listening time interval TLs(OLT) of 625 µs, the OLT 4 has to listen to an overall number of 625 µs×8 chips/µs×5 samples/chip=25 kSamples, the start time of the response message 13 being unknown.

For recovering the bits 30 from the samples 34, the OLT 4 averages over five of the samples 34, using a sampling time 35 which is asynchronous with respect to the chip phase. The correct timing (which is the right set of five samples?) can be found by subsequently comparing the detected chip patterns with the expected code words. An additional preamble at the beginning of the message further helps in identifying the start of the message. In such a way, the SNR of the reception may be improved. Once the chips 32 are recovered, the OLT 4 correlates the sequence 31 of chips 32 with a known eight chip codeword which is identical for all monitoring units DPM1 to DPM3 of the network, thus recovering the bit 30 from the response message 13.

In summary, in the way described above, a simple and reliable procedure for exchanging information between the OLT and the monitoring units is provided, without requiring complicated TDMA protocols. Moreover, energy consumption of the monitoring units can be kept low.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

The invention claimed is:

1. A method for monitoring a passive optical network, PON, having a tree-like structure with a main line and a plurality of branches, the method comprising:
   transmitting a wake-up signal from an optical line termination, OLT, arranged in the main line to a plurality of monitoring units arranged in the plurality of branches, the wake-up signal not addressing a specific one of the plurality of monitoring units and the wake-up signal configured to wake the plurality of monitoring units from a sleep mode;
   detecting the wake-up signal and listening to information requests from the OLT in the plurality of monitoring units during a listening time interval after the detection of the wake-up signal;
   transmitting, after a waiting time interval by the OLT after transmission of the wake-up signal and before any other transmission by the OLT, an information request to be received in the listening time interval from the OLT to the plurality of monitoring units; and
   receiving the information request in the plurality of monitoring units during the listening time interval, one of the plurality of monitoring units which is addressed by the information request transmitting a response message back to the OLT.

2. The method of claim 1, wherein after the detection of the wake-up signal, the plurality of monitoring units are switched from a first operation mode with lower power consumption to a second operation mode with higher power consumption.

3. The method of claim 1, wherein no further wake-up signal is transmitted by the OLT during a repetition time interval following the transmission of the information request, the repetition time interval being preferably sufficiently long to transfer the information contained in the response message from the OLT to a network management unit.

4. The method of claim 3, wherein the repetition time interval is sufficiently long to allow an energy storage of a monitoring unit which is not addressed by the information request to fully recharge by extracting energy from the downstream transmissions of the OLT.

5. The method of claim 1, wherein each bit of the response message is encoded as a binary sequence of chips, each sequence of chips being correlated with a chip sequence for recovering the bits of the response message in the OLT, preferably each chip being further divided into a plurality of samples, each chip being recovered in the OLT by averaging over at least part of the plurality of samples.

6. A monitoring unit connectable to a branch of a passive optical network, PON, comprising:
   a detection unit for detecting a wake-up signal which does not address the monitoring unit, the wake-up signal being transmitted to the monitoring unit from an optical line termination, OLT, arranged at the head end of a main line of the PON and the wake-up signal configured to wake the monitoring unit from a sleep mode;
   a listening and receiving unit for listening to information requests from the OLT during a listening time interval after the reception of the wake-up signal and after a waiting time interval by the OLT before any other transmission received from the OLT, the listening and receiving unit further for receiving the information request from the OLT during the listening time interval; and
   a transmitting unit for transmitting a response signal from the monitoring unit back to the main line in case that the received information request addresses the monitoring unit.

7. The monitoring unit of claim 6, further comprising:
a switching unit for switching from a first operation mode with lower power consumption to a second operation mode with higher power consumption after the detection of the wake-up signal.

8. The monitoring unit of claim 6, further comprising:
a rechargeable energy storage; and
an energy conversion unit for converting optical energy from the downstream transmissions of the OLT to electrical energy, the electrical energy for charging the rechargeable energy storage.

9. A passive optical network, PON, comprising:
a main line;
an optical line termination, OLT, arranged at the head end of the main line; and
a plurality of branches connected to the main line, wherein at least one of the branches includes a monitoring unit according to claim 6.

10. The passive optical network of claim 9, wherein the passive optical network is an operator network and the monitoring unit is arranged in the operator network adjacent to a demarcation point to a user network.

\* \* \* \* \*